United States Patent
Light et al.

(10) Patent No.: US 8,444,083 B2
(45) Date of Patent: May 21, 2013

(54) AUXILIARY POWER UNIT INLET

(75) Inventors: Stacey H. Light, San Diego, CA (US); Jack V. Vitale, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 175 days.

(21) Appl. No.: 13/173,447

(22) Filed: Jun. 30, 2011

(65) Prior Publication Data
US 2013/0001369 A1  Jan. 3, 2013

(51) Int. Cl.
*B64D 33/02* (2006.01)
*B64D 29/08* (2006.01)
*B64D 41/00* (2006.01)

(52) U.S. Cl.
CPC ........... *B64D 33/02* (2013.01); *B64D 29/08* (2013.01); *B64D 41/00* (2013.01)
USPC .................. 244/53 B; 244/58; 244/129.4

(58) Field of Classification Search
USPC ........... 244/53 B, 58, 54, 53 R, 129.5, 129.4; 137/15.1; 181/214
See application file for complete search history.

(56) References Cited

U.S. PATENT DOCUMENTS

| | | | |
|---|---|---|---|
| 2,242,202 A * | 5/1941 | Woods | 244/53 R |
| 6,293,494 B1 | 9/2001 | Scherer et al. | |
| 6,695,094 B2 | 2/2004 | Moffat et al. | |
| 6,704,625 B2 | 3/2004 | Albero et al. | |
| 7,137,240 B2 | 11/2006 | Thompson | |
| 7,337,605 B2 | 3/2008 | Hagshenas | |
| 7,364,117 B2 | 4/2008 | Dionne | |
| 7,469,545 B2 | 12/2008 | Riley | |
| 7,578,369 B2 | 8/2009 | Francisco et al. | |
| 7,600,714 B2 | 10/2009 | Sheoran et al. | |
| 7,611,093 B2 | 11/2009 | Campbell et al. | |

OTHER PUBLICATIONS

"APU GTCP 331-350C Removal/Installation", Jun. 18, 2007. Fiche Technique No. A330-49-002 R1.*

* cited by examiner

*Primary Examiner* — Tien Dinh
*Assistant Examiner* — Richard R Green
(74) *Attorney, Agent, or Firm* — Carlson, Gaskey & Olds, P.C.

(57) ABSTRACT

An aircraft auxiliary power unit assembly includes an aircraft skin providing a cavity. The aircraft skin is secured to a structure in an assembled condition and provides an opening. An auxiliary power unit is arranged within the cavity and secured to the structure. The aircraft skin substantially covers the auxiliary power unit in the assembled condition. An inlet duct is removably secured within the opening and is selectively connected to the auxiliary power unit between installed and service positions. The installed and service positions are with the aircraft skin in the assembled condition. A method of servicing the auxiliary power unit includes removing the auxiliary power unit inlet duct from the opening in the aircraft skin. The auxiliary power unit that is arranged within the cavity of the aircraft skin is exposed. A portion of the auxiliary power unit is serviced through the opening.

10 Claims, 3 Drawing Sheets

AUXILIARY POWER UNIT INLET

BACKGROUND

This disclosure relates to an aircraft auxiliary power unit assembly, which includes an inlet duct arranged at an aircraft skin. The disclosure also relates to a method of servicing the auxiliary power unit while keeping the aircraft skin in place.

Auxiliary power units (APU) are commonly used in aircraft to provide emergency power for various aircraft systems. Typically, the APU is mounted to structural members within a tail cone of the aircraft. Aircraft skin is secured to the structural members, such as the airframe, to enclose the APU. To service components of the APU, such as line replaceable units (LRUs), portions of the skin must be removed to provide sufficient access to the LRUs.

An inlet duct is typically integral with a housing of the APU. The inlet duct extends from the APU and seals against an interior surface of the aircraft skin within the cavity. The inlet duct cannot be removed until the skin is removed from the airframe.

SUMMARY

An aircraft auxiliary power unit assembly installed within an aircraft skin providing a cavity. The aircraft skin is secured to a structure in an assembled condition and provides an opening. An auxiliary power unit is arranged within the cavity and secured to the structure. The aircraft skin substantially covers the auxiliary power unit in the assembled condition. An inlet duct is removably secured within the opening and is selectively connected to the auxiliary power unit between installed and service positions. The installed and service positions are with the aircraft skin in the assembled condition.

A method of servicing the auxiliary power unit includes removing the auxiliary power unit inlet duct from the opening in the aircraft skin. The auxiliary power unit that is arranged within the cavity of the aircraft skin is exposed. A portion of the auxiliary power unit is serviced through the opening.

An example inlet duct includes a duct defining a passage and having first and second flanges arranged on the duct at opposite ends of the passage. The first flange includes apertures configured to receive fastening elements. A seal is secured to the second flange. Silencing elements are arranged within the passage.

BRIEF DESCRIPTION OF THE DRAWINGS

The disclosure can be further understood by reference to the following detailed description when considered in connection with the accompanying drawings wherein.

DETAILED DESCRIPTION

Figure 1:
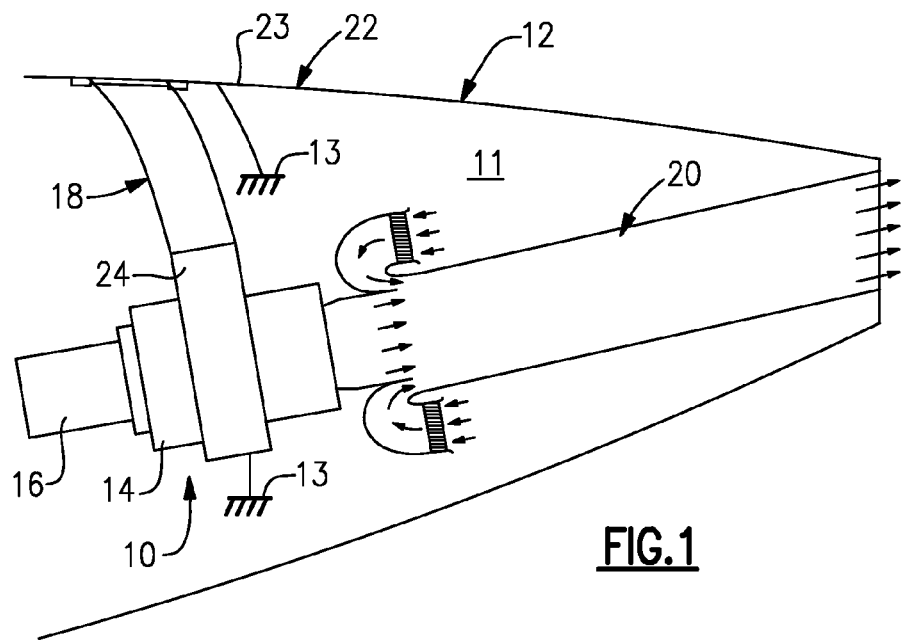
FIG. 1 is a schematic view of an APU arranged within a tail cone.

Referring to FIG. 1, an auxiliary power unit (APU) 10 is shown arranged in a cavity 11 of a tail cone 12. The APU 10 is mounted to a structural member 13. The APU 10 includes a gearbox 14 through which a generator 16 is mechanically driven in response to rotation of a shaft-mounted compressor and turbine (not shown). Air from the exterior of the tail cone 12 is supplied through an inlet duct 18 to the compressor. The compressed air, once expanded across the turbine, is expelled through an exhaust duct 20.

An aircraft skin 22 is secured to the structural member 13 in an assembled condition in which the aircraft is prepared for flight. The skin 22 provides an outer surface 23 on an exterior side of the skin 22 opposite the cavity 11. The outer surface 23 provides an aerodynamic outer mold line or contour of the tail cone 12. The inlet duct 18 is secured to the skin 22.

Figure 2:
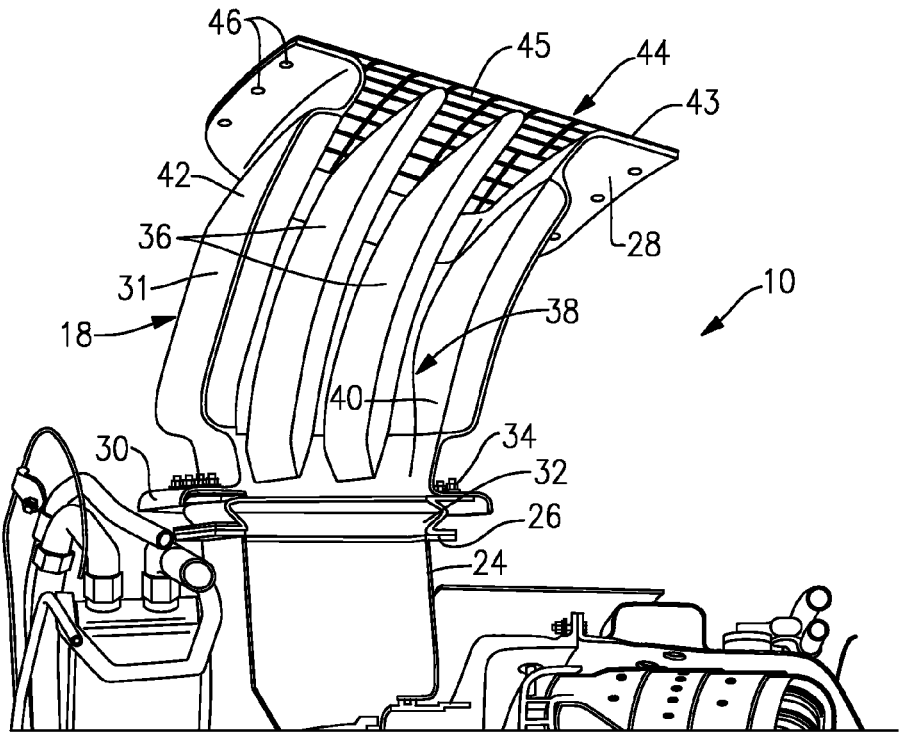
FIG. 2 is a partial cross-sectional view of the APU and an inlet duct.

Referring to FIG. 2, the APU 10 includes an inlet housing 24 having a housing flange 26. The inlet duct 18 defines a passage 38 provided by a neck 31 and includes first and second duct flanges 28, 30 arranged on opposite ends of the neck 31. The first duct flange 28 is secured to a skin flange 62 (see FIGS. 4 and 5) provided by the skin 22. In the example, the skin flange 62 is recessed from the adjoining outer surface 23 (FIG. 1). A seal 32 is secured to the second duct flange 30 with fastening elements 34. In one example, the seal 32 is a bellow-type seal that seals against the housing flange 26, enabling removal of the inlet duct 18 while the APU 10 remains secured to the structural member 13.

The inlet housing 18 is configured to reduce inlet noise during operation of the APU 10. The body of the inlet duct 18 may be constructed from a fiberglass with a phenolic resin or carbon fiber composite. It should be understood that any suitable material may be used, for example, metallic and/or non-metallic materials. A first silencing element 36, in the example, two silencing elements, is arranged within the passage 38 and extends between a wall 40 and opposite ends of the inlet duct 18. The leading edge of the first silencing element 36 includes a wear resistant structure. The wall 40 includes a second silencing element 42 circumscribing at least a portion of the passage 38. The wall 40 protrudes outward from the passage 38 to enable the second silencing element 42 to be arranged generally flush with the adjoining passage wall. In one example, the first and second silencing elements 36, 42 may include a sound-deadening structure constructed from an aluminum honeycomb to which a porous mesh is adhered with resin.

Figure 3:
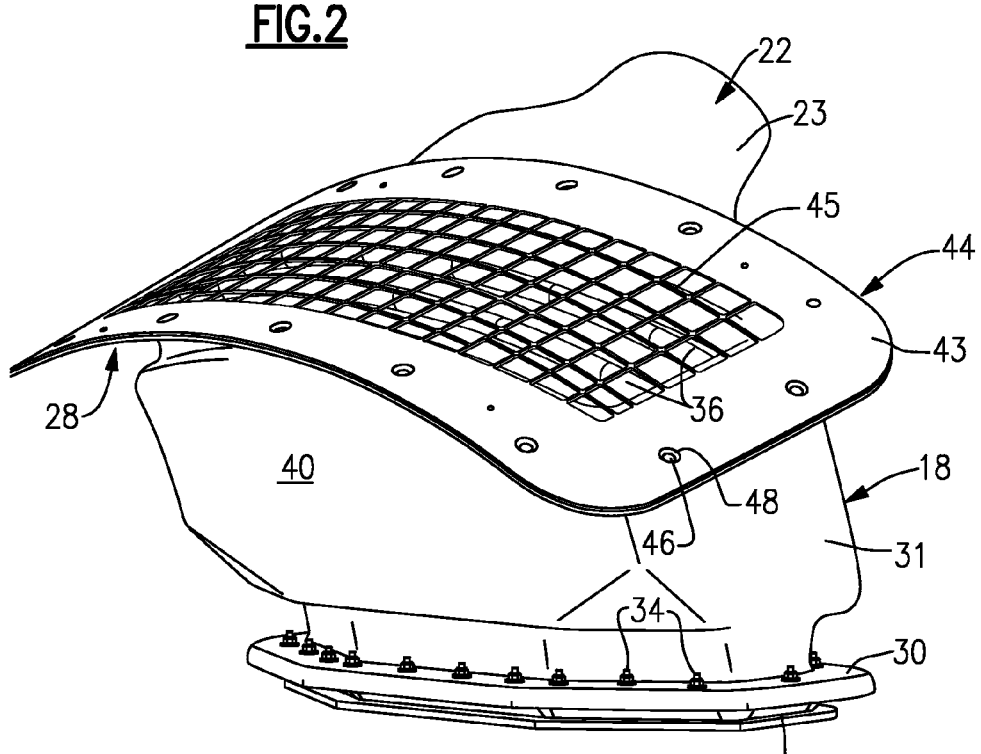
FIG. 3 is a perspective view of the inlet duct.

Referring to FIGS. 2 and 3, a screen assembly 44 is arranged over the entry of the inlet duct 18. The screen assembly 44 may be a separate structure from the inlet duct 18 (as shown in FIGS. 2 and 3) or integrated therewith. In one example, the screen assembly 44 includes a perimeter element 43 surrounding and supporting a screen 45. The screen assembly 44 generally lies within the contour provided by the outer surface 23 in an installed position, as illustrated in FIG. 3.

Figure 4:
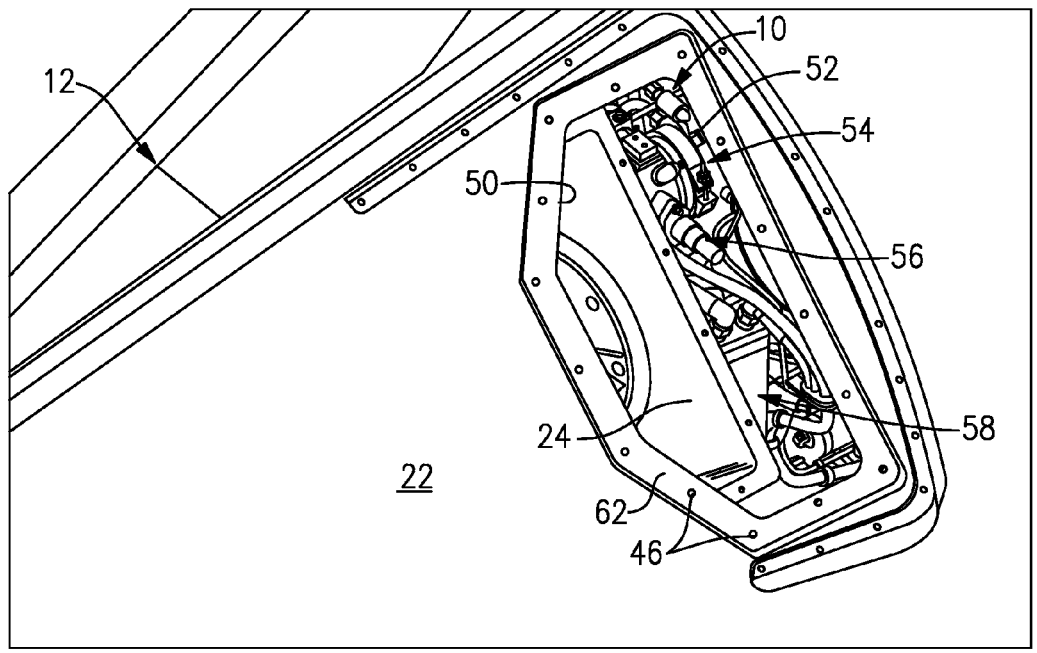
FIG. 4 is a one perspective view of the APU with the inlet duct removed to service the APU.

Apertures 46 extend through the perimeter element 43 (if a separate screen assembly is used), the first duct flange 28 and the skin flange 62 (as shown in FIG. 4). Fastening elements 66 (see FIGS. 6A-6D) secure the inlet duct 18 to the skin 22. The fastening elements 66 may be a flat machine screw and nut, for example. The outermost structure (in the example, the perimeter element 43) includes a chamfer 48 circumscribing each aperture 46 to accommodate a countersunk head and provide a more aerodynamic surface.

Figure 5:
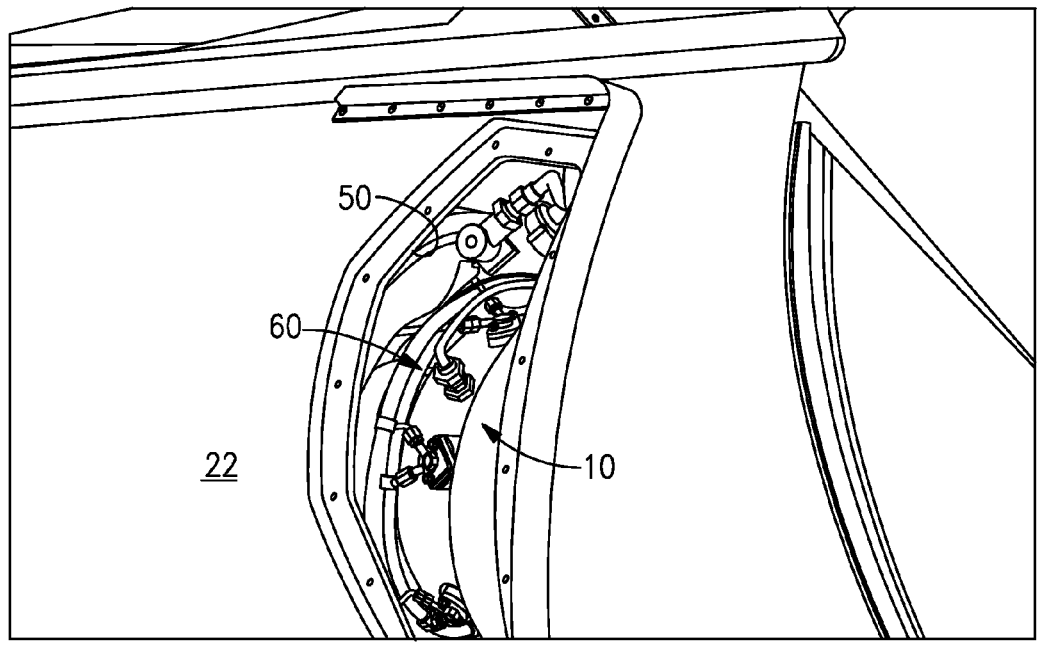
FIG. 5 is another perspective view of the APU with the inlet duct removed to service the APU.

Referring to FIGS. 4 and 5, with the inlet duct 18 and screen assembly 44 removed from the skin 22 in a service position in which the inlet duct 18 is remote from the skin 22, APU components, such as line replaceable units (LRUs), may be serviced through the opening 50. Example LRUs include a fuel control unit 52, a speed sensor 56 and an igniter 60. The fuel control unit 52 may be replaced by loosening a clamp 54. An oil cooler 58 also may be serviced and cleaned through the opening 50.

Referring to FIG. 6A-6D, multiple configurations of securing the inlet duct 18 to the skin flange 62 of the skin 22 are shown. The arrangements are exemplary, and it should be understood that different arrangements or combinations of the illustrated arrangements may be used. The inlet duct/screen assembly is arranged generally flush with the outer surface 23.

Figure 6A:
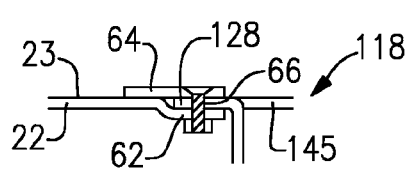
FIG. 6A is a cross-sectional view of a first arrangement of the inlet duct secured to an aircraft skin.

In an example shown in FIG. 6A, the screen 145 is integrated with the inlet duct 18. The first duct flange 128 is seated against the skin flange 62. A retainer 64 is provided over the first duct flange 128 and the outer surface 23 and secured by fastening elements 66 to retain the inlet duct 118 in the installed position.

Figure 6B:
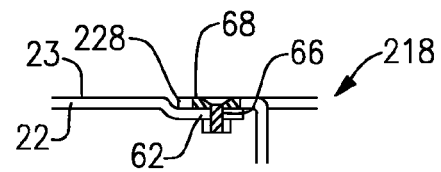
FIG. 6B is a cross-sectional view of a second arrangement of the inlet duct secured to the aircraft skin.

Referring to FIG. 6B, a reinforcing washer 68 is embedded into the first duct flange 228, which prevents composite-constructed inlet ducts from becoming crushed or cracked during installation of the inlet duct. The inlet duct 218 is secured to the skin flange 62 by the fastening element 66.

Figure 6C:
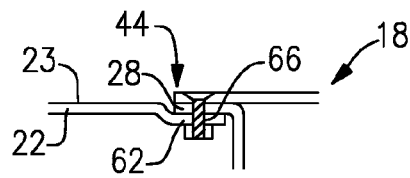
FIG. 6C is a cross-sectional view of a third arrangement of the inlet duct secured to the aircraft skin.

FIG. 6C illustrates a cross-sectional view of the inlet duct 18 and screen assembly 44, shown in FIGS. 2 and 3, secured to the skin flange 62 with fastening element 66 arranged through the first duct flange 28.

Figure 6D:
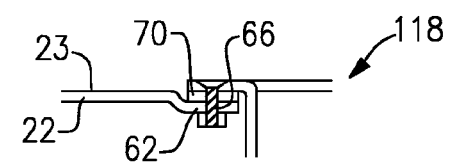
FIG. 6D is a cross-sectional view of a fourth arrangement of the inlet duct secured to the aircraft skin.

Referring to FIG. 6D, a gasket 70 is provided between the inlet duct 118 and the skin flange 62 and secured by fastening elements 66.

In operation, the method of servicing the APU 10 includes removing the inlet duct 18 (from the installed position) from the opening 50 in the skin 22 while the skin 22 remains secured to the structural member 13 in the assembled condition. The fastening elements 66 are removed, and the first duct flange 28 is unseated from the skin flange 62 that is provided around the opening 50. If the screen assembly 44 is separate, it is removed from the opening 50. The neck 31 is withdrawn from the cavity 11 through the opening 50 to the exterior side of the 22 (service position). The seal 32 is unseated from the housing flange 26, in the example.

The APU 10 is exposed with the inlet duct 18 removed, and a portion of the APU 10 is serviceable through the opening 50. An auxiliary power unit component can be serviced with the APU 10 in place within the cavity 11. For example, LRUs, such as the fuel control unit 52, the speed sensor 56, and the igniter 60, can be replaced.

Although an example embodiment has been disclosed, a worker of ordinary skill in this art would recognize that certain modifications would come within the scope of the claims. For that reason, the following claims should be studied to determine their true scope and content.

What is claimed is:

1. A method of servicing an auxiliary power unit comprising the steps of:
   removing an auxiliary power unit inlet duct from an opening in an aircraft skin without disassembling the aircraft skin;
   exposing through the opening, an auxiliary power unit arranged within a cavity of the aircraft skin; and
   servicing a portion of the auxiliary power unit through the opening without removing the auxiliary power unit.

2. The method according to claim 1, wherein the removing step includes removing fastening elements that secure the auxiliary power unit inlet duct to the aircraft skin.

3. The method according to claim 2, wherein the removing step includes unseating an inlet duct flange from a skin flange that is provided around the opening.

4. The method according to claim 3, wherein the removing step includes withdrawing an inlet duct neck, which is connected to the inlet duct flange, through the opening to an exterior side of the aircraft skin opposite the cavity.

5. The method according to claim 4, wherein the removing step includes unseating a seal arranged between the auxiliary power unit inlet duct and the auxiliary power unit.

6. The method according to claim 1, wherein the exposing step includes withdrawing the auxiliary power unit inlet duct through the opening to an exterior side of the aircraft skin opposite the cavity.

7. The method according to claim 6, wherein the exposing step includes detaching a screen arranged in the opening from the aircraft skin.

8. The method according to claim 1, wherein the servicing step includes manipulating an auxiliary power unit component with the auxiliary power unit secured within the cavity and the aircraft skin in an assembled condition.

9. The method according to claim 8, wherein the servicing step includes replacing a line replaceable unit including at least one of a fuel control unit, a speed sensor, and an igniter.

10. The method according to claim 8, wherein the servicing step includes accessing at least one of a clamp and an oil cooler.

\* \* \* \* \*